(12) United States Patent
Risbood et al.

(10) Patent No.: US 9,237,087 B1
(45) Date of Patent: Jan. 12, 2016

(54) VIRTUAL MACHINE NAME RESOLUTION

(75) Inventors: Pankaj Risbood, Bangalore (IN); Vivek Sahasranaman, Bangalore (IN)

(73) Assignee: Google Inc., Mountain View, CA (US)

(*) Notice: Subject to any disclaimer, the term of this patent is extended or adjusted under 35 U.S.C. 154(b) by 59 days.

(21) Appl. No.: 13/418,951

(22) Filed: Mar. 13, 2012

Related U.S. Application Data (60) Provisional application No. 61/453,490, filed on Mar. 16, 2011.

(51) Int. Cl.
*H04L 12/701* (2013.01)

(52) U.S. Cl.
CPC ..................................... *H04L 45/00* (2013.01)

(58) Field of Classification Search
CPC ..... H04L 12/525; H04L 49/901; H04L 49/10; H04L 49/15; H04L 12/56; H04L 2012/56; H04L 29/0653; H04L 29/06095; H04L 49/3009; H04L 49/309; H04L 45/74; H04L 61/60; H04L 12/5601; H04L 47/621; H04L 45/00
USPC ............... 370/379, 386, 389, 392, 393, 395.3
See application file for complete search history.

(56) References Cited

U.S. PATENT DOCUMENTS

| | | | |
|---|---|---|---|
| 5,463,768 A | 10/1995 | Cudihy et al. |
| 5,655,081 A | 8/1997 | Bonnell et al. |
| 5,778,444 A | 7/1998 | Langan et al. |
| 5,794,224 A | 8/1998 | Yufik |
| 6,148,368 A | 11/2000 | DeKoning |
| 6,178,482 B1 | 1/2001 | Sollars |
| 6,449,671 B1 | 9/2002 | Patkar et al. |
| 6,505,211 B1 | 1/2003 | Dessloch et al. |
| 6,505,248 B1 | 1/2003 | Casper et al. |
| 6,587,866 B1 | 7/2003 | Modi et al. |

(Continued)

FOREIGN PATENT DOCUMENTS

| | | | |
|---|---|---|---|
| EP | 1 130 845 A2 | 9/2001 |
| EP | 1130845 A2 * | 9/2001 |

(Continued)

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Mark Rinehart
*Assistant Examiner* — Natali N Pascual Peguero
(74) *Attorney, Agent, or Firm* — Fish & Richardson P.C.

(57) ABSTRACT

Methods, systems, and apparatus, including computer programs encoded on a computer storage medium, for virtual machine name resolution. In one aspect, a method includes receiving a first outgoing packet from a source virtual machine executing on the data processing apparatus destined for a destination virtual machine, wherein the destination virtual machine belongs to a first cluster of virtual machines, and wherein the first outgoing packet identifies the destination virtual machine using a unique name for the destination virtual machine; determining an internal network address of the destination virtual machine based at least in part on the unique name for the destination virtual machine; and sending the first outgoing packet to the destination virtual machine by sending the packet to the internal network address.

27 Claims, 4 Drawing Sheets

(56) References Cited

U.S. PATENT DOCUMENTS

| | | | |
|---|---|---|---|
| 6,598,179 | B1 | 7/2003 | Chirashnya et al. |
| 6,643,613 | B2 | 11/2003 | McGee et al. |
| 6,829,678 | B1 | 12/2004 | Sawdon et al. |
| 6,891,839 | B2 | 5/2005 | Albert et al. |
| 6,898,697 | B1 | 5/2005 | Gao et al. |
| 6,996,502 | B2 | 2/2006 | De La Cruz et al. |
| 7,062,718 | B2 | 6/2006 | Kodosky et al. |
| 7,117,243 | B2 | 10/2006 | Peart |
| 7,466,703 | B1 | 12/2008 | Arunachalam et al. |
| 7,478,388 | B1 | 1/2009 | Chen et al. |
| 7,529,836 | B1 | 5/2009 | Bolen et al. |
| 7,584,467 | B2 | 9/2009 | Wickham et al. |
| 7,596,620 | B1 | 9/2009 | Colton et al. |
| 7,650,331 | B1 | 1/2010 | Dean et al. |
| 7,653,833 | B1 | 1/2010 | Miller et al. |
| 7,761,573 | B2 | 7/2010 | Travostino et al. |
| 7,804,862 | B1 | 9/2010 | Olson et al. |
| 7,836,285 | B2 | 11/2010 | Giri et al. |
| 8,051,414 | B2 | 11/2011 | Stender et al. |
| 8,065,717 | B2 | 11/2011 | Band |
| 8,103,771 | B2 | 1/2012 | Tanaka et al. |
| 8,146,147 | B2 * | 3/2012 | Litvin et al. ............ 726/11 |
| 8,261,295 | B1 | 9/2012 | Risbood et al. |
| 8,276,140 | B1 | 9/2012 | Beda et al. |
| 8,296,459 | B1 | 10/2012 | Brandwine et al. |
| 8,407,687 | B2 | 3/2013 | Moshir et al. |
| 8,423,993 | B2 | 4/2013 | Faus et al. |
| 8,484,353 | B1 | 7/2013 | Johnson et al. |
| 8,504,844 | B2 | 8/2013 | Browning |
| 8,533,796 | B1 | 9/2013 | Shenoy et al. |
| 2002/0091902 | A1 | 7/2002 | Hirofuji |
| 2002/0097747 | A1 | 7/2002 | Kirkby |
| 2004/0139368 | A1 | 7/2004 | Austen et al. |
| 2004/0148484 | A1 | 7/2004 | Watanabe et al. |
| 2004/0210653 | A1 | 10/2004 | Kanoor et al. |
| 2005/0010715 | A1 | 1/2005 | Davies et al. |
| 2005/0160424 | A1 * | 7/2005 | Broussard et al. ............ 718/1 |
| 2005/0166011 | A1 | 7/2005 | Burnett et al. |
| 2005/0196030 | A1 | 9/2005 | Schofield et al. |
| 2005/0216659 | A1 | 9/2005 | Ogawa et al. |
| 2005/0237543 | A1 | 10/2005 | Kikuchi |
| 2005/0289499 | A1 | 12/2005 | Ogawa et al. |
| 2006/0026354 | A1 | 2/2006 | Lesot et al. |
| 2006/0048077 | A1 | 3/2006 | Boyles |
| 2006/0048130 | A1 | 3/2006 | Napier et al. |
| 2006/0059228 | A1 | 3/2006 | Kasamsetty et al. |
| 2006/0067236 | A1 | 3/2006 | Gupta |
| 2006/0075199 | A1 * | 4/2006 | Kallahalla et al. ............ 711/153 |
| 2006/0098618 | A1 | 5/2006 | Bouffioux |
| 2006/0136676 | A1 | 6/2006 | Park et al. |
| 2006/0153099 | A1 | 7/2006 | Feldman |
| 2006/0161753 | A1 | 7/2006 | Aschoff et al. |
| 2006/0271547 | A1 | 11/2006 | Chen et al. |
| 2007/0011361 | A1 | 1/2007 | Okada et al. |
| 2007/0112956 | A1 | 5/2007 | Chapman et al. |
| 2007/0118694 | A1 | 5/2007 | Watanabe et al. |
| 2007/0123276 | A1 | 5/2007 | Parker et al. |
| 2007/0177198 | A1 | 8/2007 | Miyata |
| 2007/0199058 | A1 | 8/2007 | Baumgart et al. |
| 2007/0271604 | A1 | 11/2007 | Webster et al. |
| 2007/0280243 | A1 | 12/2007 | Wray et al. |
| 2007/0288921 | A1 | 12/2007 | King et al. |
| 2008/0022016 | A1 * | 1/2008 | Tripathi et al. ............ 709/250 |
| 2008/0028389 | A1 | 1/2008 | Genty et al. |
| 2008/0086515 | A1 | 4/2008 | Bai et al. |
| 2008/0095176 | A1 | 4/2008 | Ong et al. |
| 2008/0107112 | A1 | 5/2008 | Kuo et al. |
| 2008/0205415 | A1 | 8/2008 | Morales |
| 2008/0208681 | A1 | 8/2008 | Hammad et al. |
| 2008/0215796 | A1 | 9/2008 | Lam et al. |
| 2008/0222246 | A1 | 9/2008 | Ebling et al. |
| 2008/0222375 | A1 | 9/2008 | Kotsovinos et al. |
| 2008/0244030 | A1 | 10/2008 | Leitheiser |
| 2008/0244471 | A1 | 10/2008 | Killian et al. |
| 2008/0250407 | A1 * | 10/2008 | Dadhia et al. ............ 718/1 |
| 2008/0270704 | A1 | 10/2008 | He et al. |
| 2008/0031324 | A1 | 12/2008 | Li et al. |
| 2008/0304516 | A1 | 12/2008 | Feng et al. |
| 2008/0307258 | A1 | 12/2008 | Challenger et al. |
| 2009/0097657 | A1 | 4/2009 | Schiedt et al. |
| 2009/0150629 | A1 | 6/2009 | Noguchi et al. |
| 2009/0199177 | A1 | 8/2009 | Edwards et al. |
| 2009/0222815 | A1 | 9/2009 | Dake |
| 2009/0241108 | A1 | 9/2009 | Edwards et al. |
| 2009/0249440 | A1 | 10/2009 | Platt et al. |
| 2009/0276771 | A1 | 11/2009 | Nickolov et al. |
| 2009/0282266 | A1 | 11/2009 | Fries et al. |
| 2009/0300605 | A1 | 12/2009 | Edwards et al. |
| 2009/0310554 | A1 | 12/2009 | Sun et al. |
| 2010/0023582 | A1 | 1/2010 | Pedersen et al. |
| 2010/0046426 | A1 | 2/2010 | Shenoy et al. |
| 2010/0057913 | A1 | 3/2010 | DeHaan |
| 2010/0071035 | A1 | 3/2010 | Budko et al. |
| 2010/0088335 | A1 | 4/2010 | Mimatsu |
| 2010/0095000 | A1 | 4/2010 | Kettler et al. |
| 2010/0199089 | A1 | 8/2010 | Vysogorets et al. |
| 2010/0212004 | A1 | 8/2010 | Fu |
| 2010/0215050 | A1 | 8/2010 | Kanada |
| 2010/0217927 | A1 | 8/2010 | Song |
| 2010/0235649 | A1 | 9/2010 | Jeffries et al. |
| 2010/0274984 | A1 | 10/2010 | Inomata et al. |
| 2010/0287548 | A1 | 11/2010 | Zhou et al. |
| 2010/0293285 | A1 | 11/2010 | Oishi et al. |
| 2010/0303241 | A1 | 12/2010 | Breyel |
| 2011/0010483 | A1 | 1/2011 | Liljeberg |
| 2011/0022812 | A1 | 1/2011 | van der Linden et al. |
| 2011/0078363 | A1 | 3/2011 | Yeh et al. |
| 2011/0085563 | A1 | 4/2011 | Kotha et al. |
| 2011/0103389 | A1 | 5/2011 | Kidambi et al. |
| 2011/0153697 | A1 | 6/2011 | Nickolov et al. |
| 2011/0153838 | A1 | 6/2011 | Belkine et al. |
| 2011/0191485 | A1 | 8/2011 | Umbehocker |
| 2011/0191768 | A1 | 8/2011 | Smith |
| 2011/0231280 | A1 | 9/2011 | Farah |
| 2011/0246767 | A1 | 10/2011 | Chatuvedi et al. |
| 2011/0258441 | A1 | 10/2011 | Ashok et al. |
| 2011/0296157 | A1 | 12/2011 | Konetski et al. |
| 2011/0302400 | A1 | 12/2011 | Maino et al. |
| 2011/0302415 | A1 | 12/2011 | Ahmad et al. |
| 2012/0060018 | A1 | 3/2012 | Shinde et al. |
| 2012/0063458 | A1 | 3/2012 | Klink et al. |
| 2012/0089981 | A1 | 4/2012 | Tripathi et al. |
| 2012/0159634 | A1 | 6/2012 | Haikney et al. |
| 2012/0173866 | A1 | 7/2012 | Ashok et al. |
| 2012/0179796 | A1 | 7/2012 | Nagaraj et al. |
| 2012/0185688 | A1 | 7/2012 | Thornton |
| 2012/0191912 | A1 | 7/2012 | Kadatch et al. |
| 2012/0233678 | A1 | 9/2012 | Pal |
| 2012/0233705 | A1 | 9/2012 | Boysen et al. |
| 2012/0246637 | A1 | 9/2012 | Kreeger et al. |
| 2012/0266159 | A1 | 10/2012 | Risbood et al. |
| 2013/0074181 | A1 | 3/2013 | Singh |
| 2013/0081014 | A1 | 3/2013 | Kadatch et al. |
| 2013/0117801 | A1 | 5/2013 | Shieh et al. |
| 2013/0212709 | A1 | 8/2013 | Tucker |
| 2013/0227303 | A1 | 8/2013 | Kadatch et al. |
| 2013/0262405 | A1 | 10/2013 | Kadatch et al. |

FOREIGN PATENT DOCUMENTS

| | | |
|---|---|---|
| EP | 1 253 766 B1 | 12/2005 |
| EP | 1253766 B1 * | 12/2005 |
| WO | WO 2011/095516 | 8/2011 |

OTHER PUBLICATIONS

Primet, Pascale, et al.., "HIPCAL: State of the Art of OS and Network virtualization solutions for Grids", Sep. 14, 2007, 38 pages.

Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.

Farinacci et al., "RFC 2784: Generic Routing Encapsulation (GRE)", Mar. 2000, The Internet Society, 10 pages.

(56) References Cited

OTHER PUBLICATIONS

Kent et al., "RFC 4301: Security Architecture for the Internet Protocol", Dec. 2005, The Internet Society, 102 pages.
Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online], Dec. 12, 2010; [Retrieved on Jan. 20, 2011] Retrieved from the Internet <URL: http://en.wikipedia.org/wiki/OAuth>; 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios—Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.
"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
Live Migration of Virtual Machines, Clark et al., University of Cambridge Laboratory, Department of Computer Science; University of Copenhagen, Denmark, 2005; 14 pages.
Making Services Easy to Migrate, Debian Administration, System Administration Tips and Resources, Jan. 1, 2005, 5 pages.

(56) References Cited

OTHER PUBLICATIONS

L. Gommans, et al., Token-Based Authorization of Connection Oriented Network Resources, 1st International Workshop on Networks for Grid Applications (Grid Nets 2004), Oct. 29, 2004; 8 pages.

Hyun, Ahn Ji, Authorized Officer for Korean Intellectual Property Office, International Search Report and Written Opinion for PCT/US2012/021846, International Search Report completed May 25, 2012, 8 pages.

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, Jan. 2000, vol. 39, Issue 1, pp. 211-238.

Bok, Jin Yo, Authorized Officer for Korean Intellectual Property Office, International Search Report and Written Opinion for PCT/US2012/029210, International Search Report completed Oct. 10, 2012, 2 pages.

Anonymous, Storage I/O Control Technical Overview and Consideration for Deployment VMware vSphere™ 4.1, Jan. 1, 2010, XP055044491, retrieved from the internet: URL: http://www.vmware.com/fled/pdf/techpaper/WMW-vSphere41-SIOC.pdf; [retrieved on Nov. 21, 2012], the entire document.

Cabellos et al., LISPmob: Mobile Networking through LISP, Apr. 2, 2012, 8 pages.

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24 2013, 11 pages.

Eng, Lili, Australian Government, IP Australia, Examiner's First Report for 2012200562, dated Jun. 4, 2012, 2 pages.

\* cited by examiner

VIRTUAL MACHINE NAME RESOLUTION

CROSS REFERENCE TO RELATED APPLICATION

This application claims the benefit under 35 U.S.C. §119 (e) of U.S. Patent Application No. 61/453,490, filed Mar. 16, 2011, entitled "Virtual Machine Name Resolution," which is incorporated by reference herein in its entirety.

BACKGROUND

This specification relates to communications between virtual machines.

Cloud computing is network-based computing in which collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines. In a public cloud computing environment, multiple users are able to launch virtual machines (VMs), and each VM launched by a user is included in a cluster of other VMs launched by the user.

BRIEF DESCRIPTION OF THE DRAWINGS

Like reference numbers and designations in the various drawings indicate like elements.

SUMMARY

In general, one innovative aspect of the subject matter described in this specification can be embodied in methods that include the actions of receiving a first outgoing packet from a source virtual machine destined for a destination virtual machine, wherein the destination virtual machine belongs to a first cluster of virtual machines, and wherein the first outgoing packet identifies the destination virtual machine using a unique name for the destination virtual machine; determining an internal network address of the destination virtual machine based at least in part on the unique name for the destination virtual machine; and sending the first outgoing packet to the destination virtual machine by sending the packet to the internal network address.

Other embodiments of this aspect include corresponding systems, apparatus, and computer programs, configured to perform the actions of the methods, encoded on computer storage devices.

These and other embodiments can each optionally include one or more of the following features. Receiving, resolving, and sending are performed in a user space of an operating system. The source virtual machine belongs to the first cluster of virtual machines. The unique name for the destination virtual machine is assigned to the destination virtual machine by a name association system when the destination virtual machine is launched. The unique name is a string of characters, the string of characters comprising an internal domain name corresponding to the first cluster of virtual machines. Obtaining data associating unique names for each of a plurality of virtual machines in the first cluster with corresponding internal network addresses for virtual machines in the first cluster, the plurality of virtual machines including the destination virtual machine; and storing the obtained data. Determining the internal network address of the destination virtual machine comprises: determining a corresponding internal network address for the unique name for the destination virtual machine using the obtained data. The data is obtained from a respective data processing apparatus hosting each of the plurality of virtual machines. The data is published by a name association system over a publisher-subscriber channel. Joining a discovery group used by the name association system to publish the data, wherein the discovery group only publishes data for virtual machines in the first cluster of virtual machines. The source virtual machine belongs to a second, different cluster of virtual machines. Receiving a second outgoing packet, the second outgoing packet including a second unique name identifying a recipient of the second outgoing packet; determining that the second unique name does not correspond to any internal network address of any virtual machine belonging to the first cluster of virtual machines; obtaining an external network address corresponding to the second unique name from a Domain Name System service; and sending the second outgoing packet to the obtained external network address.

Particular embodiments of the subject matter described in this specification can be implemented so as to realize one or more of the following advantages. A virtual machine within a particular cluster of virtual machines launched by a user can communicate with another virtual machine in the cluster without knowing the network address of the other virtual machine, e.g., by knowing only the unique name of the other virtual machine. The unique name for the other virtual machine can be based on input from the user, allowing the user to easily configure virtual machines within the cluster to communicate with each other. A single name resolution service can be used to resolve names of virtual machines internal to a cluster as well as names of external resources. A user can easily specify which virtual machines can communicate with virtual machines in the user's cluster by specifying which virtual machines have access to unique name-network address association information for virtual machines in the user's cluster.

DETAILED DESCRIPTION

Figure 1:
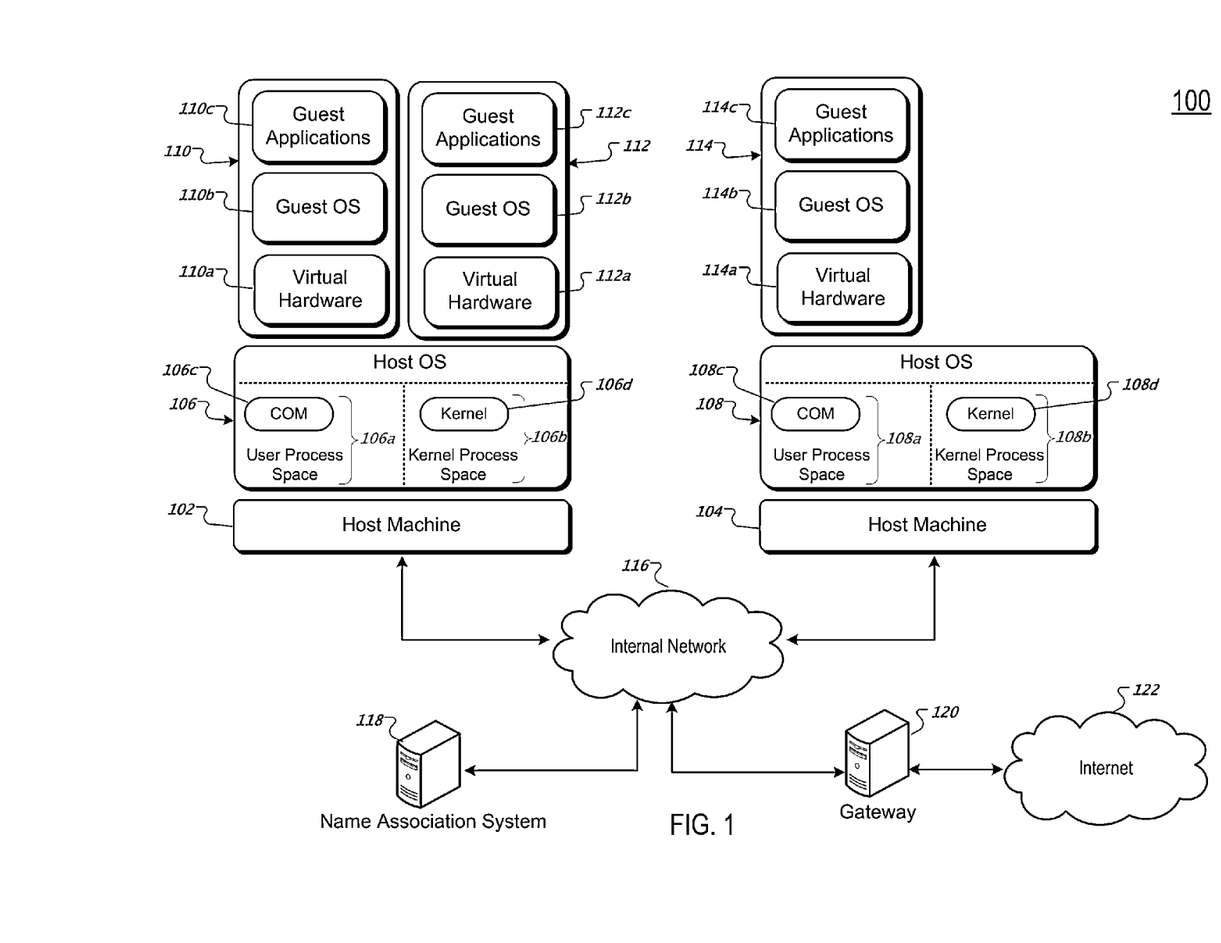
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatuses such as rack mounted servers or other computing devices. The data processing apparatuses can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatuses responsible for routing data communication traffic between the internal network 116 and the external network 122. Other types of external networks are possible.

Each host machine executes a host operating system or other software that virtualizes physical hardware (e.g., the underlying host machine hardware or other hardware) and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. The term "virtual disk drive," as used herein, is a broad term encompassing its plain and ordinary meaning, including, but not limited to, a simulated version of a physical disk drive. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example.

In addition to virtual memory and virtual disk resources, VMs can be allocated network addresses through which their respective guest software can communicate with other processes reachable through the internal network 116 or the Internet 122. In particular, when a user launches a VM, the VM is included in a cluster of VMs launched by the user and is assigned an external network address and an internal network address, e.g., by a name association system 116. The network addresses can be, for example, Internet Protocol (IP) addresses. In some implementations, each VM is allocated one or more unique Internet Protocol (IP) version 4 or version 6 addresses, one or more User Datagram Protocol (UDP) port numbers, or both. Other address schemes are possible.

The external network address is used by data processing apparatuses not within the particular user's cluster to communicate with the newly-launched VM, e.g., over the Internet 122 or another external network. The internal network address is used by other VMs in the user's cluster of VMs to communicate with the newly-launched VM, e.g., over the internal network 116. As will be discussed in more detail below, the newly-launched VM is also given a unique name so that other VMs in the user's cluster of VMs can communicate with the newly-launched VM by using the unique name for the newly-launched VM and without knowing the internal network address of the newly-launched VM.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. Similarly, the kernel process space 108b is virtual memory reserved for the host operating system 108's kernel 108d.

The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c or communication process 108c). In some implementations, the communication process executes in the user process space (e.g., user process space 106a or user process space 108a) of a host operating system (e.g., host operating system 106 or host operating system 108). In other implementations, the communication process can execute in the kernel process space (e.g., kernel process space 106d or kernel process space 108d) of the host operating system. There can be a single communication process for all VMs executing on a host machine or multiple communication processes, one for each VM executing on a host machine. In yet further implementations, some portion of the communication process executes in the user process space and another portion executes in the kernel process space. For example, the communications process 106c receives packets sent by VM 110 or VM 112 and forwards the packets to the destination identified in the packet.

The name association system 118 is one or more data processing apparatuses that execute software for keeping track of assignments of network addresses (e.g., IP addresses) to VMs. The data processing apparatuses can be in different locations and can have different capabilities and computer architectures. When a user desires to create a VM, the name association system 118 generates a unique name for the VM. In some implementations, the unique name is generated based on user input. For example, the unique name can be a string that is derived from a name given to the VM by the user. In particular, the unique name can be a string that includes a name given to the VM by the user (e.g., "database," "backend," "webserver") with an appended internal domain name that corresponds to the user's cluster of VMs. The appended internal domain name can be a non-routable domain, e.g., a domain that cannot serve as a destination of packets over the Internet 122. For example, if the appended domain name that corresponds to the user's cluster of VMs is "example," a name for a particular VM in the cluster may be "database.example."

The name association system 118 obtains an internal network address for the new VM and associates the internal network address of the new VM with the unique name of the VM, e.g., in a domain name system (DNS) record. In some implementations, the name association system 118 generates and assigns the internal network address for the new VM. Alternatively, the name association system 118 can obtain the internal network address for the new VM from another service executing on a same or different data processing apparatus from name association system 118. Generally, the unique names for a given user's VMs are visible only to other VMs of the user and the name-address information cannot be retrieved from the public Internet.

In some implementations, the name association system 118 then publishes the internal network address and the associated name to a discovery group. For example, the name association system can use a publisher-subscriber channel to publish this information to a discovery group that includes the other VMs in a user's cluster. Alternatively, each VM can publish information about its own unique name and associated internal network address over the channel. The name-address associations for each VM can be published repeatedly to ensure that newly-launched VMs will have access to the information. Additionally, if the name association system 118 receives information indicating that a VM in the cluster has been taken down, i.e., that the VM is no longer executing, the association can be deleted and information indicating the VM's status as no longer executing can be published. Thus, a look up for the unique name of the taken down VM may return an indication that the VM cannot be found or that the VM is no longer executing.

In some implementations, a name resolution service runs in a communications process, e.g., the communications process 106a, on the host machine of each VM in the user's cluster. In some other implementations, the name resolution service for a particular VM can execute independently of the communication process for the VM on host machine 102. In yet other implementations, the name resolution service can execute on a data processing apparatus different from host machine 102, e.g., on the same data processing apparatus as the name association system 118.

The name resolution service can, when the VM is first launched, subscribe to the discovery group corresponding to the user's cluster. The name resolution service receives and stores unique name-address associations for the other VMs in the user's cluster over, for example, a publisher-subscriber channel. The name resolution service can also optionally publish its own name-address information over the publisher-subscriber channel.

When the VM 110 sends a packet, the packet is forwarded to the communications process 106a. If the packet includes a name of a destination, e.g., instead of a network address of the destination, the communications process sends a request to the name resolution service to obtain the network address of the desired destination. In some implementations, the request is addressed to an external name resolution service, e.g., a conventional DNS service, and is intercepted by the name resolution service. The name resolution service receives the request, determines the network address of the destination that is named in the request, and provides the network address to the communications process 106a. Once the internal network address for the destination VM is obtained, the communications process 106a can transmit the packet to the destination VM, as identified by the obtained internal network address.

In some implementations, if the packet includes a network address, e.g., an internal network address or an external network address of the destination, the communications process can transmit the packet to the destination without consulting the name resolution service.

In some implementations, the name association system 118 also associates configuration information for each VM in a cluster with the name/address information for the VM. For example, the name association system 118 can associate a tag, i.e., a label, with one or more VMs in a cluster, e.g., based on user input indicating which VMs are to be associated with the tag. For example, a user may submit an input indicating that multiple VMs are each to be associated with a tag "backend." The name association system 118 can associate the indicated VMs with the tag and publish information identifying the association.

In these implementations, when a VM sends a packet that identifies the destination using the tag "backend," the name resolution service will return the internal network address of each of the VMs in the cluster that are associated with that tag. The name resolution service therefore allows requests destined for VMs associated with a "backend" tag VM to be load balanced, e.g., using round robin DNS, across the VMs associated with the tag "backend."

The configuration information can also include, for example, the port, e.g., a UDP port, on the host machine of a particular VM that is allocated to the particular VM. In these cases, a lookup using the unique name of the particular VM would return the port information along with the internal network address.

Figure 2:
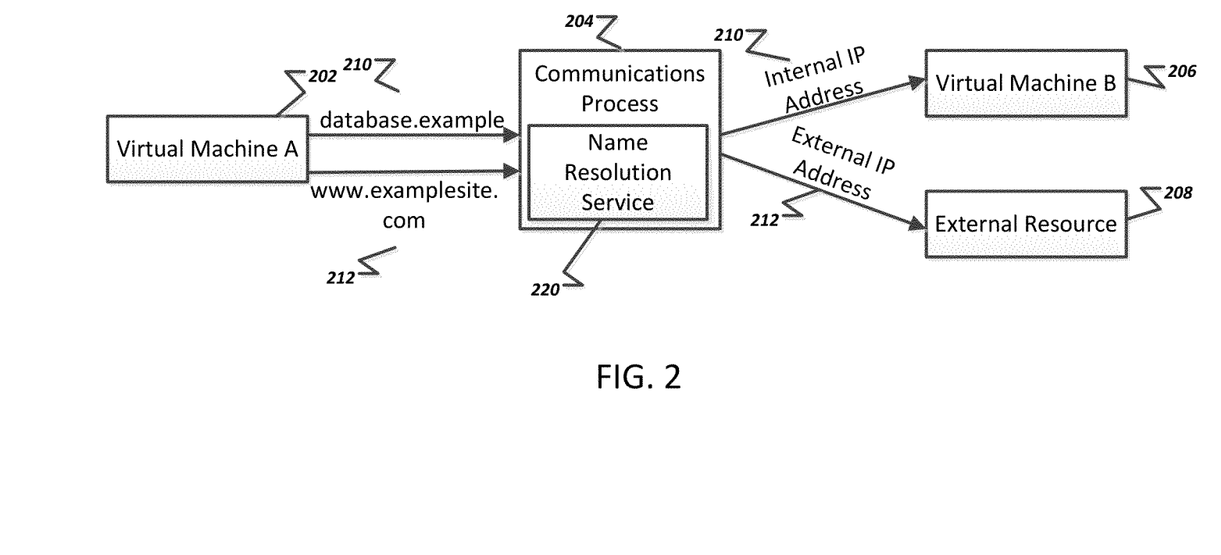
FIG. 2 is a diagram illustrating name resolution.

FIG. 2 is a diagram illustrating name resolution. VM A 202 and VM B 206 are included in a cluster associated with a particular cluster, i.e., both VM A 202 and VM B 206 were launched by the same user. VM A 202 and VM B 206 can execute on the same data processing apparatus. Alternatively VM A 202 and VM B 206 can execute on separate data processing apparatuses.

As illustrated in FIG. 2, VM A 202 sends a packet 210 that is intended for VM B 204. The packet 210 identifies the recipient by the unique name assigned to VM B within the cluster, e.g., "database.example." The unique name can have been assigned to VM B 204 by a name association system, e.g., name association system 116 of FIG. 1, when VM B 204 was launched by the user. A communications process 204 receives the packet 210 and submits a request to resolve the unique name of the recipient to a name resolution service 220. The name resolution service can execute within the communications process 204. Alternatively, the name resolution service 220 can execute independently of, e.g., on separate data processing apparatuses from, the communications process 204. In some implementations, the request submitted by the communications process 204 is addressed to an external name resolution service, e.g., a conventional DNS service, and is intercepted by the name resolution service 220.

The name resolution service 220 can consult stored associations between unique names and internal network addresses of VMs in the cluster. In the illustrated example, the name resolution service 220 determines that the unique name indicated by the packet 210 is associated with the internal network address of VM B 206. The name resolution service 220 transmits data identifying the internal network address of VM B 206 to the communications process 204 in response to the request. The communications process 204 then sends the packet 210 to VM B 206, e.g., over an internal network, by sending the packet 210 to the internal network address of VM B 206.

In some circumstances, the unique name identified by a received packet may not be associated with any VMs in the cluster, e.g., if no association is stored between the unique name and an internal network address. In some implementations, upon determining that the unique name is not associated with any VM in the cluster, the name resolution service 220 can request the network address associated with the name from an external name resolution service. The external name resolution service can be, for example, a conventional DNS service. For example, when the name resolution service 220 performs a lookup for a name that does not have an appended internal domain identifier that corresponds to the user's cluster (such as a request for www.examplesite.com), the name resolution service 220 can obtain the IP address that corresponds to the name (e.g., the IP address of www.examplesite.com) from an external name resolution service.

In the illustrated example, the communications process 204 receives a packet 212 originating from VM A 202 and submits a request for the network address of the destination of the packet 212 to the name resolution service 220. The name resolution service 220 determines that the unique name included in the packet 212, ("www.examplesite.com") is not associated with any of the VMs in the cluster of VMs. In some implementations, the name resolution service 220 makes this determination by identifying that the unique name included in the packet 212 does not include the internal domain name that corresponds to the user's cluster of VMs. The name resolution service 220 obtains an IP address, i.e., the IP address of external resource 208, that corresponds to the unique name included in the packet 212 from an external name resolution service. The communications process 204 then sends the packet 212 to the external resource 208 by addressing it to the obtained IP address.

Figure 3:
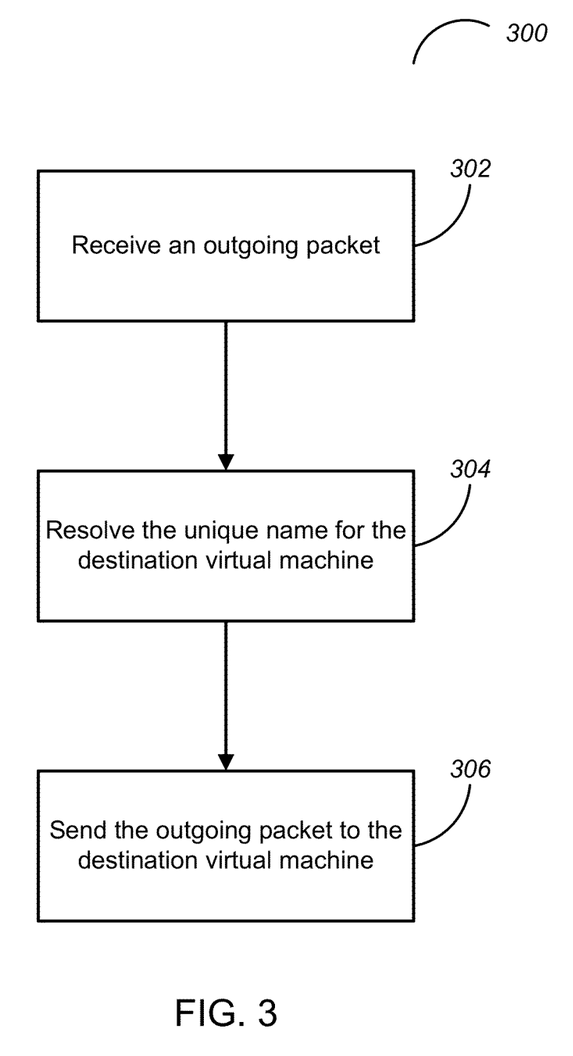
FIG. 3 is a flow diagram illustrating an example technique of sending a packet to a destination virtual machine by resolving the unique name of the destination virtual machine.

FIG. 3 is a flow diagram illustrating an example technique 300 of sending a packet to a destination virtual machine by resolving the unique name of the destination virtual machine. The technique 300 can be performed by one or more data processing apparatuses. For example, a communications process (e.g., communications process 106a of FIG. 1) can be used to perform the technique 300.

The communications process receives 302 an outgoing packet from a source virtual machine destined for a destination virtual machine. The outgoing packet can identify the destination virtual machine by the unique name for the virtual machine rather than by an internal network address of the destination virtual machine.

The communications process resolves 304 the unique name for the destination virtual machine to an internal network address of the destination virtual machine. The communications process can resolve the unique name by consulting a name resolution service executing within the process. Alternatively, the communications process can transmit the unique name or the outgoing packet to a name resolution service executing independently of the communications process, e.g., on separate data processing apparatuses, to resolve the unique name.

The communications process sends 306 sends the outgoing packet to the destination virtual machine by sending the packet to the internal network address.

The techniques for name resolution described above describe implementations where associations between internal network addresses of VMs in a cluster and the unique names of the VMs are propagated only within the cluster. For example, the name-address association information can be published to a particular discovery group, and only other VMs in the cluster can join the discovery group. However, in some implementations, unique name-network address association information can be published to multiple clusters. For example, a first user can allow VMs launched by a second user to communicate with VMs in the first user's cluster. When this occurs, VMs launched by the other users are given permission to join the discovery group associated with the first user's cluster. A name resolution service on each of the VMs launched by the second user can then join the discovery group to obtain the name-address information for VMs in the cluster of the first user. VMs launched by the second user are therefore able to send packets to a VM in the cluster of the first user even if they only know the unique name, and not the internal or external network address, of the VM.

Figure 4:
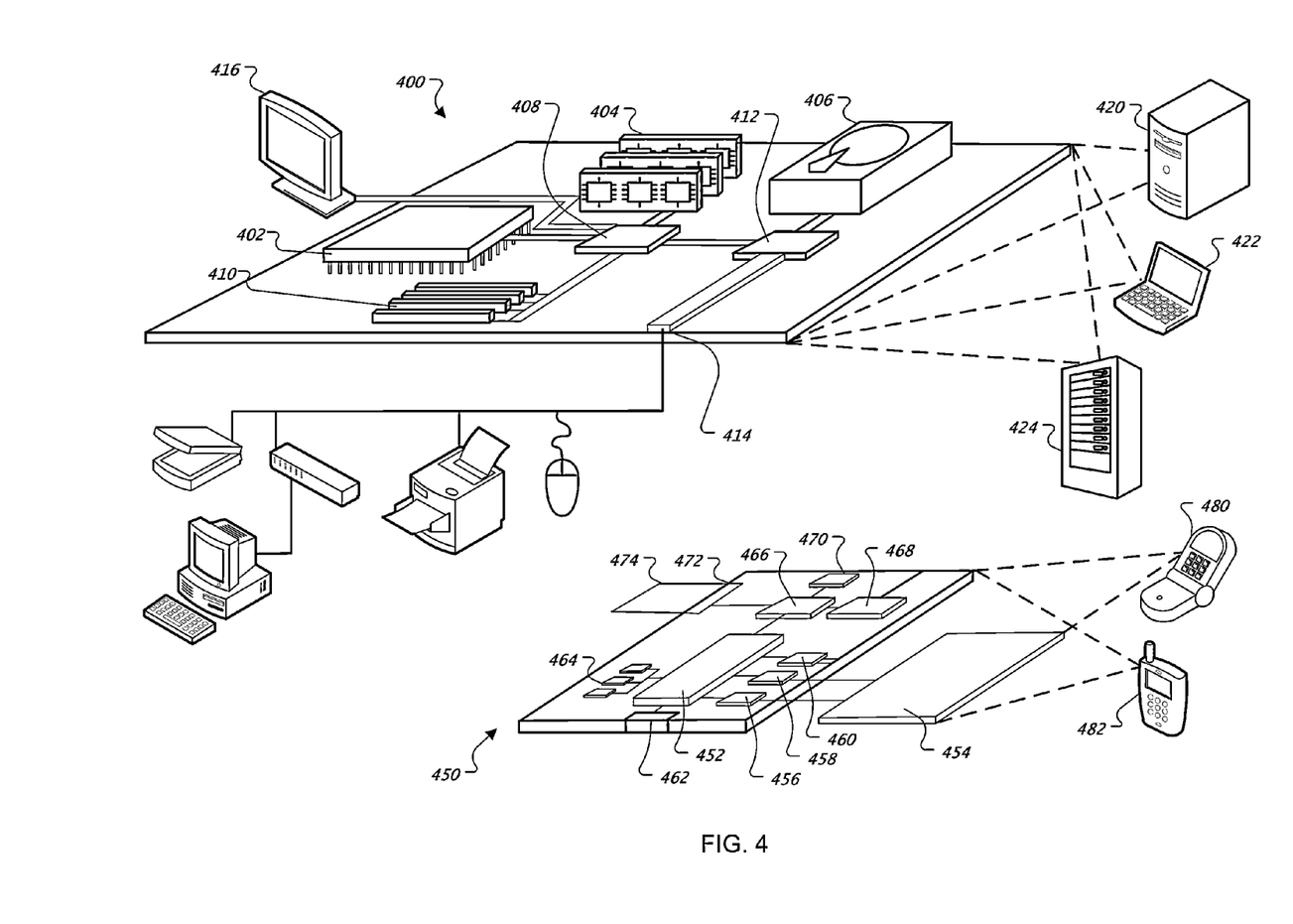
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. The phrase 'computing device' as used herein encompasses its plain and ordinary meaning, including, but not limited to, various forms of digital computers and mobile devices. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for virtual machine name resolution may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method implemented by data processing apparatus, the method comprising: maintaining, by the data processing apparatus, data that associates, for each of a plurality of virtual machines in a first cluster of virtual machines launched by a first user, a unique name for the virtual machine with an internal network address for the virtual machine, wherein the internal network address for the virtual machine is a network address used by other virtual machines in the first cluster to communicate with the virtual machine over an internal network; receiving, by a process executing on the data processing apparatus and from a source virtual machine executing on the data processing apparatus, a first outgoing packet destined for a recipient; determining that the first outgoing packet identifies the recipient by a unique name for the recipient instead of by a network address for the recipient; in response to determining that the first outgoing packet identifies the recipient by the unique name for the recipient instead of by a network address for the recipient, determining, by the process executing on the data processing apparatus and from the maintained data, that the unique name is associated in the maintained data with an internal network address of a destination virtual machine that belongs to the first cluster of virtual machines, wherein the unique name for the destination virtual machine is assigned to the destination virtual machine by a name association system when the destination virtual machine is launched; and sending the first outgoing packet to the internal network address of the destination virtual machine.

2. The method of claim 1, wherein the process executes in a user space of an operating system.

3. The method of claim 1, wherein the source virtual machine belongs to the first cluster of virtual machines.

4. The method of claim 1, wherein the unique name is a string of characters, the string of characters comprising an internal domain name corresponding to the first cluster of virtual machines.

5. The method of claim 1, further comprising obtaining the data from a respective data processing apparatus hosting each of the plurality of virtual machines.

6. The method of claim 1, wherein the data is published by a name association system over a publisher-subscriber channel.

7. The method of claim 6, further comprising:
joining a discovery group used by the name association system to publish the data, wherein the discovery group only publishes data for virtual machines in the first cluster of virtual machines.

8. The method of claim 1, wherein the source virtual machine belongs to a second, different cluster of virtual machines.

9. The method of claim 1, further comprising:
receiving a second outgoing packet destined for a second recipient;
determining that the second outgoing packet identifies the second recipient by a second unique name for the second recipient instead of by a network address of the second recipient;
in response to determining that the second outgoing packet identifies the second recipient by a second unique name for the second recipient instead of by a network address of the second recipient, determining whether the second unique name is associated with any internal network address of any virtual machine belonging to the first cluster of virtual machines in the maintained data;
in response to determining that the second unique name is not associated with any internal network address in the maintained data, obtaining an external network address corresponding to the second unique name from a Domain Name System service; and
sending the second outgoing packet to the obtained external network address.

10. A non-transitory storage medium encoded with instructions which, when executed by data processing apparatus, cause the data processing apparatus to perform operations comprising: maintaining, by the data processing apparatus, data that associates, for each of a plurality of virtual machines in a first cluster of virtual machines launched by a first user, a unique name for the virtual machine with an internal network address for the virtual machine, wherein the internal network address for the virtual machine is a network address used by other virtual machines in the first cluster to communicate with the virtual machine over an internal network; receiving, by a process executing on the data processing apparatus and from a source virtual machine executing on the data processing apparatus, a first outgoing packet destined for a recipient; determining that the first outgoing packet identifies the recipient by a unique name for the recipient instead of by a network address for the recipient; in response to determining that the first outgoing packet identifies the recipient by a unique name for the recipient instead of by a network address for the recipient, determining, by the process executing on the data processing apparatus and from the maintained data, that the unique name is associated in the maintained data with an internal network address of a destination virtual machine that belongs to the first cluster of virtual machines, wherein the unique name for the destination virtual machine is assigned to the destination virtual machine by a name association system when the destination virtual machine is launched; and sending the first outgoing packet to the internal network address of the destination virtual machine.

11. The storage medium of claim 10, wherein the process executes in a user space of an operating system.

12. The storage medium of claim 10, wherein the source virtual machine belongs to the first cluster of virtual machines.

13. The storage medium of claim 10, wherein the unique name is a string of characters, the string of characters comprising an internal domain name corresponding to the first cluster of virtual machines.

14. The storage medium of claim 10, the operations further comprising obtaining the data from a respective data processing apparatus hosting each of the plurality of virtual machines.

15. The storage medium of claim 10, wherein the data is published by a name association system over a publisher-subscriber channel.

16. The storage medium of claim 15, the operations further comprising:
joining a discovery group used by the name association system to publish the data, wherein the discovery group only publishes data for virtual machines in the first cluster of virtual machines.

17. The storage medium of claim 10, wherein the source virtual machine belongs to a second, different cluster of virtual machines.

18. The storage medium of claim 10, the operations further comprising:
receiving a second outgoing packet destined for a second recipient;
determining that the second outgoing packet identifies the second recipient by a second unique name for the second recipient instead of by a network address of the second recipient;
in response to determining that the second outgoing packet identifies the second recipient by a second unique name for the second recipient instead of by a network address of the second recipient, determining whether the second unique name is associated with any internal network address of any virtual machine belonging to the first cluster of virtual machines in the maintained data;
in response to determining that the second unique name is not associated with any internal network address in the maintained data, obtaining an external network address corresponding to the second unique name from a Domain Name System service; and
sending the second outgoing packet to the obtained external network address.

19. A system comprising one or more data processing apparatus and one or more storage devices storing instructions that when executed by the data processing apparatus cause the data processing apparatus to perform operations comprising: maintaining, by the data processing apparatus, data that associates, for each of a plurality of virtual machines in a first cluster of virtual machines launched by a first user, a unique name for the virtual machine with an internal network address for the virtual machine, wherein the internal network address for the virtual machine is a network address used by other virtual machines in the first cluster to communicate with the virtual machine over an internal network; receiving, by a process executing on the data processing apparatus and from a source virtual machine executing on the data processing apparatus, a first outgoing packet destined for a recipient; determining that the first outgoing packet identifies the recipient by a unique name for the recipient instead of by a network address for the recipient; in response to determining that the first outgoing packet identifies the recipient by a unique name for the recipient instead of by a network address for the recipient, determining, by the process executing on the data processing apparatus and from the maintained data, that the unique name is associated in the maintained data with an internal network address of a destination virtual machine that belongs to the first cluster of virtual machines, wherein the unique name for the destination virtual machine is assigned to the destination virtual machine by a name association system when the destination virtual machine is launched; and sending the first outgoing packet to the internal network address of the destination virtual machine.

20. The system of claim 19, wherein the process executes in a user space of an operating system.

21. The system of claim 19, wherein the source virtual machine belongs to the first cluster of virtual machines.

22. The system of claim 19, wherein the unique name is a string of characters, the string of characters comprising an internal domain name corresponding to the first cluster of virtual machines.

23. The system of claim 19, the operations further comprising obtaining the data from a respective data processing apparatus hosting each of the plurality of virtual machines.

24. The system of claim 19, wherein the data is published by a name association system over a publisher-subscriber channel.

25. The system of claim 24, the operations further comprising:
    joining a discovery group used by the name association system to publish the data, wherein the discovery group only publishes data for virtual machines in the first cluster of virtual machines.

26. The system of claim 19, wherein the source virtual machine belongs to a second, different cluster of virtual machines.

27. The system of claim 19, the operations further comprising:
    receiving a second outgoing packet destined for a second recipient;
    determining that the second outgoing packet identifies the second recipient by a second unique name for the second recipient instead of by a network address of the second recipient;
    in response to determining that the second outgoing packet identifies the second recipient by a second unique name for the second recipient instead of by a network address of the second recipient, determining whether the second unique name is associated with any internal network address of any virtual machine belonging to the first cluster of virtual machines in the maintained data;
    in response to determining that the second unique name is not associated with any internal network address in the maintained data, obtaining an external network address corresponding to the second unique name from a Domain Name System service; and
    sending the second outgoing packet to the obtained external network address.

* * * * *